INVENTORS
TOKU HOJO
HIROFUMI TAKEYA
BY Paul M. Craig, Jr.
ATTORNEY

INVENTORS
TOKU HOJO
HIROFUMI TAKEYA
BY Paul M. Craig, Jr.
ATTORNEY

INVENTORS
TOKU HOJO
HIROFUMI TAKEYA
BY Paul M. Craig, Jr.
ATTORNEY

INVENTORS
TOKU HOJO
HIROFUMI TAKEYA
BY Paul M. Craig, Jr.
ATTORNEY

INVENTORS
TOKU HOJO
HIROFUMI TAKEYA
BY Paul M. Craig, Jr.
ATTORNEY

INVENTORS
TOKU HOJO
HIROFUMI TAKEYA
BY Paul M. Craig, Jr.
ATTORNEY

United States Patent Office 3,380,069

Patented Apr. 23, 1968

3,380,069

LINE PRINTER EMPLOYING SELECTABLE ELECTRODE MATRICES ARRAYED ON A ROTATING DRUM

Toku Hojo and Hirofumi Takeya, Yokohama, Japan, assignors to Hitachi, Ltd., Tokyo, Japan, a corporation of Japan Filed June 18, 1963, Ser. No. 288,712
Claims priority, application Japan, June 19, 1962, 37/24,722
5 Claims. (Cl. 346—74)

ABSTRACT OF THE DISCLOSURE

A high speed printing apparatus for printing wherein a rotary printing drum is provided carrying needle-like elementary type electrodes set out in a predetermined order. Fixed selector electrodes are provided opposing the rotary drum and an electrostatic recording sheet passes through, at which time the needle-like electrodes scan the recording sheet. High voltage pulses representative of a character to be recorded are applied between the needle-like elementary type electrodes and the fixed selector electrodes whereby characters each consisting of dots are printed on the recording sheet.

This invention relates to the so-called line-printing of the output information of electronic computers and the like. The line-printing system is based on the conception that characters as referred to herein, which include letters, numerals and marks, can all be represented by respective combinations or arrangements of dots or character elements. In the system the least area enveloping the figures of all characters to be printed is finely divided into rows and columns of elementary areas sufficient in number to accurately define the characters and such rows or columns of elementary areas are rearranged into a time sequence in which the surface of a recording sheet to be imprinted with characters is scanned with a very limited number of elementary types, which will be described hereinafter in detail, in quite the same manner as with the case of forming a television image. For each of the characters, the printing operation is repeated each time when any of the elementary types comes to coincide with the elementary areas required to define the particular character.

The so-called line printer is well known as a high-speed information printing system and employs a rotary plate cylinder or an endless belt which carries for each character a row of identical types in the same number as that of characters to be included in a single line of print. In this system, it is apparent that as the number of characters used increases the circumferential length of the plate cylinder or belt is proportionally increased to make the entire structure bulky. In addition, the speed of travel of the types, being subject to mechanical limitations, cannot be raised infinitely and the system involves a deficiency that the printing speed is reduced in proportion to the increase in number of the characters used.

In the method of the present invention, unlike the above-described system, a rectangular area just sufficient to cover the figures of all characters to be printed is divided into rows and columns of elementary areas, and elementary types corresponding in number to the columns of such elementary areas and a very limited number of types of respective forms inadequate to be divided into elementary types are carried on a rotary plate cylinder or an endless belt which is operable in synchronism with a unit for generating signals representing characters to be printed. The output of said signal generating unit is connected to the corresponding column position of a stationary selective printing head under control of a selective control circuit operable in accordance with the output information of the computer. According to the present invention, it is possible to line-print several hundreds of characters, which can be represented by respective combinations of elementary printing areas, at any limited speeds and particularly at such high speeds as entirely infeasible with the above known line-printing system.

The present invention will now be described in detail with reference to the accompanying drawings, which illustrate one embodiment of the invention and in which.

Figure 6:
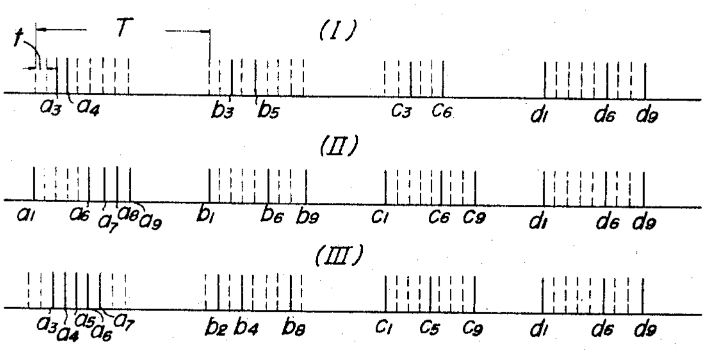
Figure 7:
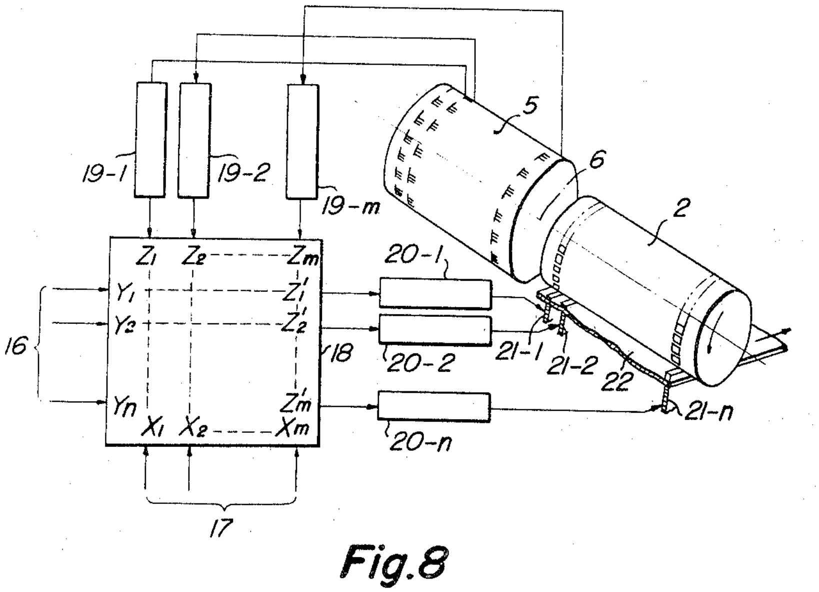
Figure 8:
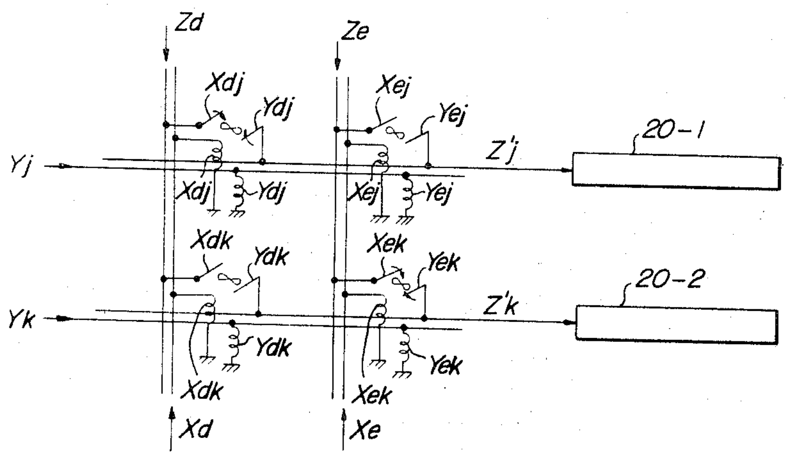
Figure 9:
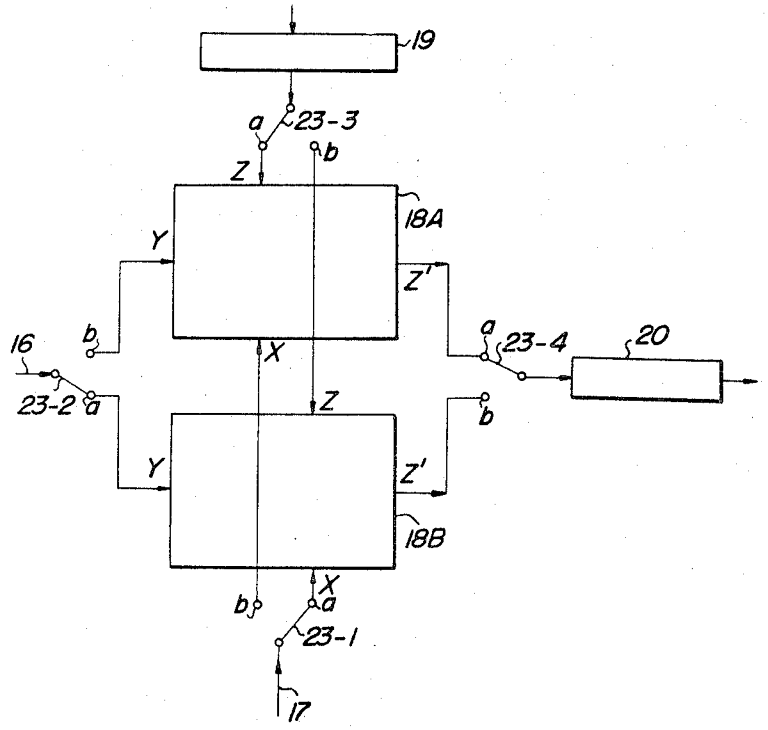

FIG. 6 exemplifies the output of the signal generator unit operable to generate series of signal pulses corresponding to the characters;

FIG. 7 is a schematic diagram of the entire system;

FIG. 8 is an explanatory diagram showing the construction of the selective connecting circuit; and FIG. 9 is a diagram showing a modification including two selective connecting circuits adapted to be switched from each other.

At the first, the division of the character area or the least area just sufficient to include the figures of all characters, to be scanned for printing, and the combination of elementary areas to form such characters will be explained.

Figure 1:
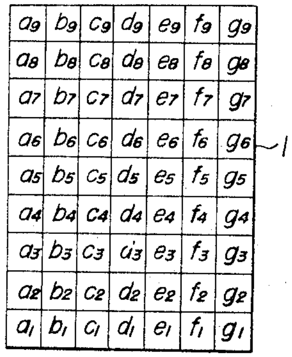
FIG. 1 illustrates an example of dividing the character area into rows and columns of elementary areas.
Figure 2:
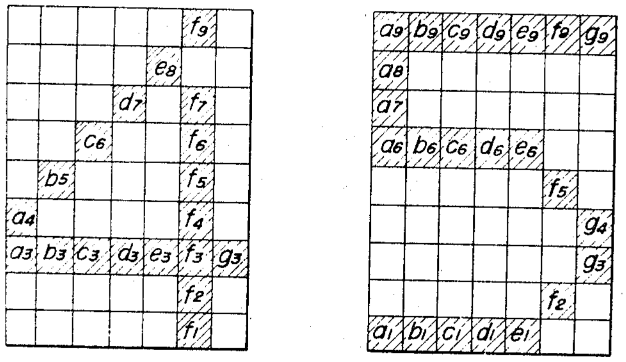
FIG. 2 illustrates two combinations of elementary areas representing the figures "4" and "5"
Figure 3:
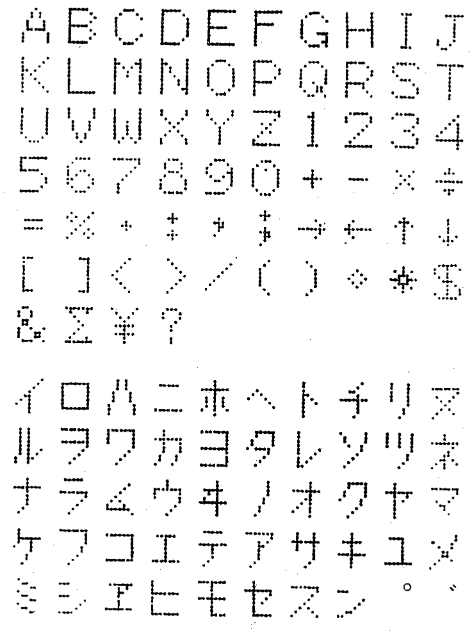
FIG. 3 illustrates a set of 112 characters each defined by a combination of dots or elementary areas as obtained by dividing the character area into nine rows and seven columns of such elementary areas.

FIG. 1 illustrates one example of dividing the character to be recorded into a plurality of elementary areas. The rectangular character defining space 1 is divided into nine rows and seven columns of elementary character forming areas and thus includes 63 such elementary areas *a*1, *a*2, *a*3, . . . , *g*7, *g*8 and *g*9. It is possible to define at least 100 characters by properly combining the 63 elementary character forming areas. FIG. 2 illustrates two numerical figures "4" and "5" defined in this manner, and FIG. 3 illustrates, by way of example only, a set of 112 characters including roman capital letters, numerical figures, signs and "katakana" or square Japanese syllables, each of the characters being defined by a combination of dots or circular elementary areas. In this figure, the dots are shown in a reduced scale relative to the size of the characters to clearly show the manner in which the elementary character forming areas are combined and thus are excessively spaced apart from each other particularly in diagonal strokes. Two characters appearing at the bottom right of FIG. 3 are marks to be affixed to semivoiced and voiced "katakana," respectively, which are examples of those characters inadequate to be divided into elementary character forming areas in the present method. In this instance with the two marks included, in fact a total of 137 characters can be defined.

Figure 4:
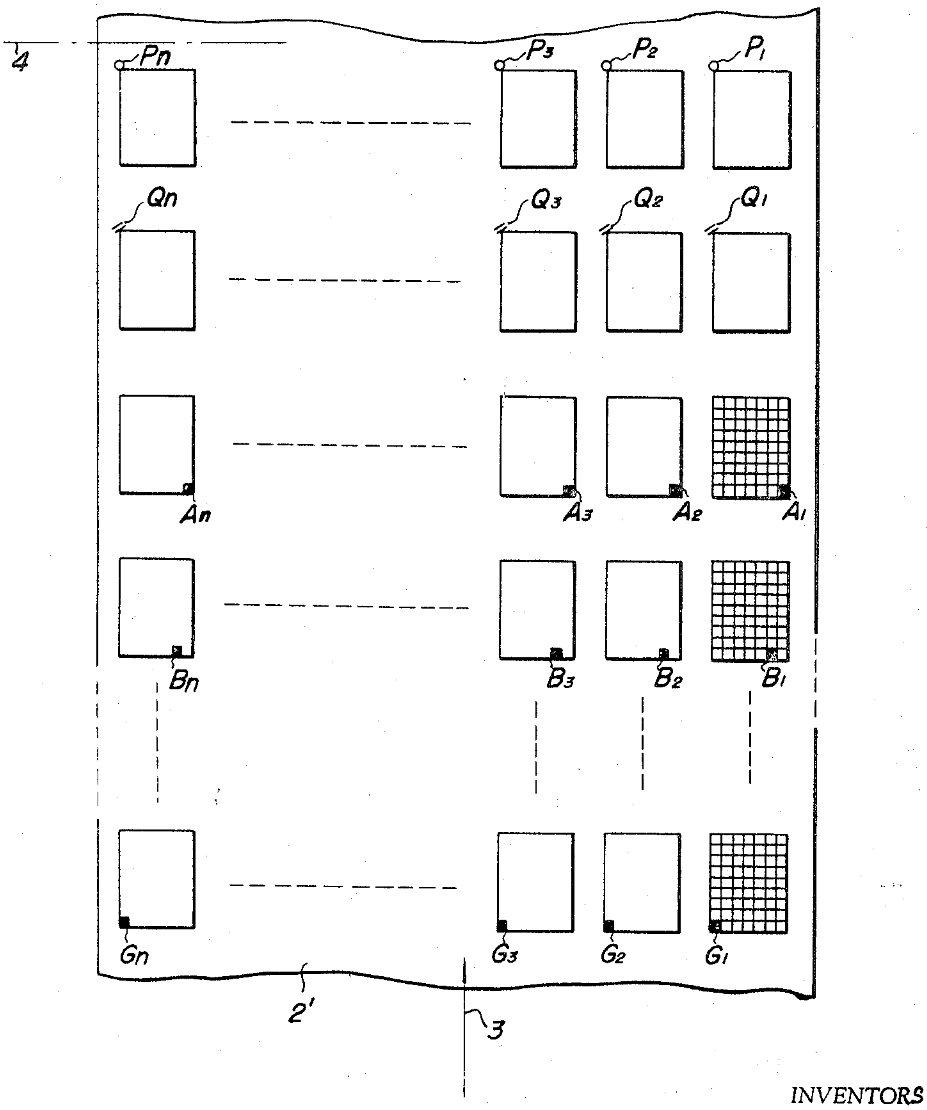
FIG. 4 is a diagrammatic development of the surface of the rotary type-carrying electrode.

Description will next be made on a rotary type-carrying cylinder peculiar to the present invention which is adapted to scan a recording medium and form characters thereon. FIG. 4 is a diagrammatic development of the surface of the rotary, type-carrying cylinder indicated at 2 in FIG. 7, showing the arrangement thereon of groups of character defining spaces made up of elementary character forming areas P*i*, Q*i*, A*i*, B*i*, . . . G*i*, *i* representing an integer from 1 to *n*, where each area, such as $A_1$, comprises a needle-like, elementary type electrode that corresponds to an elementary character forming area such as *a*1, *a*2, *a*3, . . . , *g*7, *g*8 and *g*9 shown in FIGURE 1. In one particular embodiment of the invention, there were nine rows of such character defining spaces positioned around the periphery of cylinder 2 with each row containing *n* such spaces. As can be seen in FIGURES 1, each space contains 7 columns. Hence, there are 7*n*=*n* columns in a row of spaces where *n* is the total number of elementary character forming areas (or elementary type electrodes) in each row. Each of the elementary type electrodes $A_1$ $B_1$ . . . $G_n$ in each character defining space are set in the surface of the electroconductive type-carrying cylinder 2 by suitable means to extend beyond the cylindrical surface a distance of 0.2 to 0.5 millimeter. P*i* and Q*i* designate types for printing marks of voiced and semivoiced "katakana," which are inadequate to be divided into elementary areas. A*i*, B*i*, . . . , G*i* designate character defining elementary type electrodes positioned corresponding to the respective elementary areas *a*1, *b*1, . . . , *g*1 of the character area 1 of FIG. 1. (In FIG. 4, imaginary frame lines 1 are drawn only to indicate the relative position of each of the character defining spaces formed by the 7 x 9 matrices of elementary type electrodes.) In operation, as the rotary, type-carrying cylinder 2 rotates in a direction as indicated by the arrow 3, the character defining spaces formed by the elementary type electrodes scan or pass over *n* fixed selector electrodes 21–1, 21–2, . . . , 21–*n* defining respective elementary printing areas in the order of the semivoiced marks, voiced marks, and elementary areas [*a*1, *a*2, . . . , *a*9], [*b*1, *b*2, . . . , *b*9], . . . , [*g*1, *g*2, . . . , *g*9]. Each individual or discrete selector electrode corresponds in width to the dimension of an elementary character forming area (or elementary type electrode) such as $A_1$, $B_1$, . . . $G_n$ which in turn corresponds to the elementary areas *a*1, *b*1, *c*1, . . . *g*1 shown in FIGURE 1. The fixed selector electrodes are disposed in closely spaced relation to the surface of the rotary electrode 2 and insulated from each other. Accordingly, the entire character area of an electrostatic recording sheet 22 (FIG. 7) when passed through the space between the rotary type-carrying cylinder 2 and the fixed selector electrodes [21–1, 21–2, . . . , 21–*n*], is completely scanned as the nine rows of character defining, elementary type electrode arranged in *n* columns on the rotary type carrying cylinder are carried over the fixed electrodes. In one embodiment, the rotary type-carrying cylinder 2 preferably has a diameter of from 100 to 300 millimeters to carry on its peripheral surface a plurality of rows of character defining spaces formed by elementary type electrodes, each space including elementary type electrodes arranged in seven columns and nine rows, there being *n* spaces in each row, as shown in FIG. 4. In case the rotary cylinder 2 has a diameter of 150 millimeters, it may accommodate four to six such rows of elementary types depending upon the size thereof.

Figure 5:
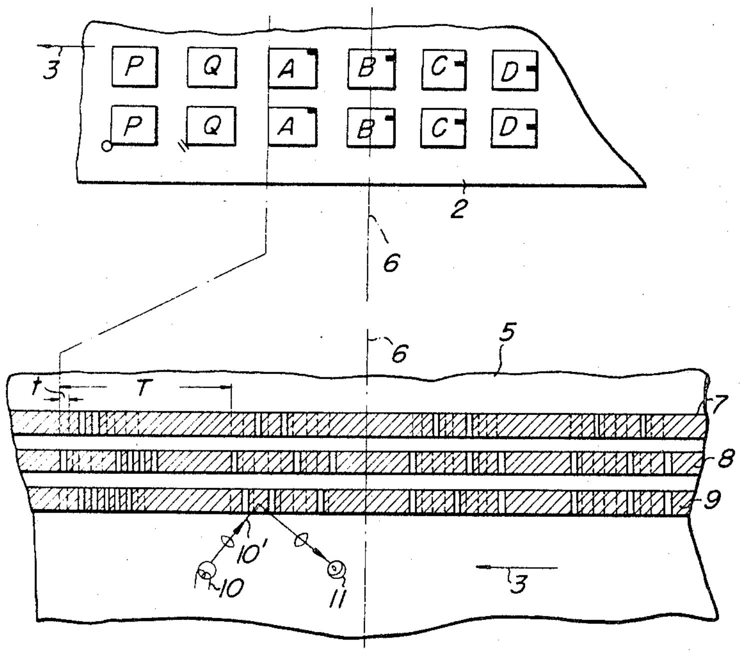
FIG. 5 is a fragmentary diagrammatic development of the surface of the pattern drum carrying rows of character patterns.

Description will next be made on the manner of generating a signal including a series of printing pulses for scanning a character (which will be referred to as series of character pulses hereinafter) according to a second feature of the present invention. Referring to FIGS. 5 and 7, numeral 5 indicates a pattern drum carrying *m* columns of stripes, only three of which are shown as indicated at 7, 8 and 9 in the lower half of FIGURE 5 and which are formed about the outer peripheral surface of the drum 5. Each column has a black-and-white pattern corresponding to the particular combination of elementary areas required to define a particular character and representing one of *m* characters to be printed. The pattern drum 5 is integrally connected with the rotary type-carrying electrode 2 by way of a shaft 6 so that upon rotation of the latter the drum 5 rotates in the direction of the arrow 3 at the same angular velocity as the rotary electrode 2. A light source 10 is provided to produce a convergent beam of light 10′ which is directed to impinge upon each of said stripes. In operation, the light beam 10′ is modulated by the black-and-white pattern of the stripe to enter one of photoelectric signal detectors 11 provided for the *m* respective pattern stripes so that a character pulse generator [19–1, 19–2, . . . , 19–*m*] produces a signal output including a series of character pulses corresponding to the character being scanned.

In FIG. 5, the rotary, type-carrying electrode 2 and pattern drum 5 are partly illustrated in development for convenience's sake and stripes 7, 8 and 9 include black-and-white patterns respectively corresponding to the combinations of elementary areas representing numerical figures "4," "5" and "6," respectively. In FIG. 6, there are shown at *a*, *b*, and *c* parts of the series of character pulses appearing in the respective outputs of those character pulse generators 19–1, 19–2, . . . 19–M corresponding to the numerical figures "4," "5" and "6," respectively. In this figure, reference characters T and *t* indicate the time relation of the series of character pulses to the black-and-white patterns shown in FIG. 5. Also in FIG. 6, vertical solid lines indicate positions of the respective pulses while broken lines indicate positions where no pulse is produced. Such series of character pulses also might be produced by arranging on the pattern drum 5 suitable magnetic patterns or patterns of electroconductive segments to be detected by magnetic pickup or electric brush means. In any event, it is important that the columns of black-and-white patterns are each arranged on the rotating drum 5 in a manner so as to correctly define a particular character when moved in synchronism with the rotation of the type-carrying electrode 2.

Next, the selective connecting circuit forming a third feature of the present invention will be described in detail. In FIGURE 7, there is shown one form of selective connecting circuit 18, which is arranged so as to selectively operate in accordance with the output information, for example, of an electronic computer to connect the outputs of *m* character pulse generating circuits 19–1, 19–2, . . . , 19–*m* with the inputs of high-voltage pulse generating circuits 20–1, 20–2, . . . , 20–*n*, which are provided for driving the fixed selector electrodes 21–1, 21–2, . . . , 21–*n* corresponding to the *n* respective columns of elementary types on the rotary electrode. The relationship of the black and white character patterns formed on drum 5 to the character to be printed can best be appreciated from a comparison of FIGURE 5, FIGURE 6 and FIGURE 2. Assume, for example, that the character "5" is to be printed. From an examination of FIGURE 2, it will be seen that within the character defining space of a selected column of spaces, the elementary areas at which dots should be printed are $a_1$, $a_6$, $a_7$, $a_8$ and $a_9$; $b_1$, $b_6$ and $b_9$; $c_1$, $c_6$, and $c_9$; etc. By comparison of this pattern, to the black and white stripes depicted by column 8 in the lower half of FIGURE 5, and to curve II in FIGURE 6, it will be seen that an appropriately timed, pulse waveform signal is derived to represent the character desired. As illustrated, the selective connecting circuit 18 has *n* input terminals Y1, Y2, . . . , Y*n* for receiving column selecting signals 16 from the electronic computer not shown for selecting *n* printing columns or positions, input terminals X1, X2, . . . , X*m* for receiving character selecting signals 17 from the electronic computer, input terminals Z1, Z2, . . . , Z*m* connected with *m* character pulse generating circuits 19–1, 19–2, . . . , 19–*m* for receiving respective character pulse signals therefrom, and *m* output terminals Z1′, Z2′, . . . , Z*m*′ for transmitting selected character pulse signals to the inputs of $n$ high voltage pulse generating circuits 20–1, 20–2, . . . , 20–$n$, as illustrated in FIG. 7.

The operation of the selective connecting circuit 18 will be described in further detail in conjunction with FIG. 8, which illustrates part of the interior structure of one form of such circuit. In FIG. 8 [X*d*, X*e*], [Y*j*, Y*k*], [Z*d*, Z*e*] and [Z'*j*, Z'*k*] designate any two terminals in each of said terminal groups. [X*dj*, K*dk*] and [X*ej*, X*ek*] are character selecting relays connected to respective terminals X*d* and X*e*; X*dj*, X*dk*, X*ej* and X*ek* are operating contacts of respective relays X*dj*, X*dk*, X*ej* and X*ek*. [Y*dj*, Y*dk*] and [Y*ej*, Y*ek*] are column selecting relays connected to respective terminals Y*j* and Y*k*; and Y*dj*, Y*ej*, Y*dk* and Y*ek* are operating contacts of respective relays Y*dj*, Y*ej*, Y*dk* and Y*ek*. Any two contacts carrying the same suffix including two letters *d* and *j*, for example, X*dj* and Y*dj*, are connected in series so as to close, when the two relays X*dj* and Y*dj* simultaneously receive a selecting pulse current from the electronic computer or the like, to interconnect terminals Z*d* and Z*j'*. At the instant, a self-holding circuit device, not shown, operates to continually assure such interconnection until it is rendered inoperative by a reset signal when one line of characters has been completely printed. As observed, the selective connecting circuit 18 has $n \times m$ pairs of relays X*dj* and Y*dj*, and upon simultaneous operation of any pair of relays carrying the same suffix, the output of one of $m$ character pulse generating circuits is selected to be connected with the input of one of $n$ high voltage pulse generating circuits 20–1, 20–2, . . . , 20–$n$ to self-hold and then the elementary types on the rotary electrode 2 start to pass over the selector electrodes 21–1, 21–2, . . . , 21–$n$ while at the same time a signal including a series of character pulses is produced so that a series of high voltage pulses corresponding to the character pattern is applied between the rotary electrode 2 and the fixed selector electrodes. These pulses have each a very short duration and a voltage of from 800 to 1600 volts. In this manner, a desired line of electrostatically charged character images corresponding to the respective combinations of elementary areas is formed on the electrostatic recording sheet 22 travelling between the rotary and fixed electrodes in the direction of the arrow. The output information from the electronic computer or the like may be directed to the terminals 16 and 17 in various ways to operate relays X*dj* and Y*dj*. For example, $n \times m$ pairs of contacts of relays [X*aa*, Y*aa*], . . . , [X*nm*, Y*nm*] are successively set to open or close at regular time intervals $t_c$. In this case, the total setting time at least amounts to the time interval $t_c$ multiplied by $n \times m$. In another way, all of the column positions required for each character are simultaneously pulsed to perform the column setting at regular time intervals of $t_c$. In this case, the total setting time required corresponds only to the time interval $t_c$ multiplied by $m$. In the former case, where relays are employed, the time interval $t_c$ cannot be reduced below a certain value required to avoid misoperation of the relays. Thus, when it is desired to obtain high printing speeds, the latter method is recommendable in which a column setting is performed for each character. However, even in the latter method, at least a length of time of $m \times t_c$ is required to elapse before the character selection is completely set. Therefore, it is necessary, in arranging the elementary types on the rotary type-carrying electrode 2, to provide a space corresponding to the required setting time at the end of each row of elementary types for the purpose of preventing any of the elementary types from passing over the selector electrodes during the setting time and the printing speed is reduced to this extent. This deficiency can be eliminated by employing a required number of, for example, two, selective connecting circuits 18A and 18B, as illustrated in FIG. 9. The input and output terminals , X, Y, Z, Z' of the two connecting circuits are alternately switched over by switches 23–1, 23–2, 23–3 and 23–4 in a manner so that during the time when one of the circuits 18B is set, the other circuit 18A operates through previously set connections to transmit signals from the character pulse generating circuits 19 to the high voltage pulse generating circuits 20 without any delay. This means that only a very short space is required at the end of each row of rotating types for the switching operation between the two circuits 18A and 18B. In the above description, electromagnetic relays are employed for the selective connection of the matrix circuit 18 for convenience's sake. These relays, however, may be modified so that any pair of coils X*dj* and Y*dj* are wound on a common core to form a self-holding relay including a single operating contact in place of two operating contacts used in the illustrated embodiment, said single operating contact being closed when the two coils are pulsed simultaneously and held closed until a reset current passes either through coil X*dj* or coil Y*dj*. Alternatively, electronic tube or semiconductor switching elements may be employed in place of relays. In this case, it will be readily understood that the setting time is extremely reduced as compared with the case of employing relays, thus enabling much higher line-printing speeds.

For purpose of illustration, an example will be described in which one character, for example, (5), consisting of dots as shown in FIGURE 3, is electrostatically printed in the first space column on the recording sheet.

As the black and white pattern corresponding to the "5" provided on the pattern drum 5 (FIGURE 7) is detected by photoelectric means, one of the character pulse generators for example, the generator 19–1, generates the pulse train corresponding to "5" as shown in FIGURE 6 (II). At this time, the electronic computer generates the signal 16 specifying the column and the signal 17 representative of the character. When the information instructing the printer to print the "5" in the first column on the recording sheet, is fed to the connecting circuit 18, this circuit connects the character pulse generator 19–1 and the high voltage pulse generator 20–1 to feed the pulse train corresponding to the "5" to the high voltage pulse generator 20–1. Pulse generator 20–1 then applies a high voltage pulse train as shown in FIGURE 6 (II) across the rotary printing type cylinder 2 and the fixed electrode 21–1.

On the peripheral surface of the rotary printing type cylinder 2 are provided 4 to 6 rows of character defining spaces each row consisting of $n$-columns and 9 rows of elementary type electrodes as shown in FIGURE 4. The elementary type electrodes which are in the first column are $P_1$, $Q_1$, $A_1$, $B_1$, . . . , $G_1$. Since the printing of only the "5" is concerned here, the description of the operation of the elementary type electrode $P_1$ and $Q_1$ shall be omitted.

The elementary type electrodes $A_1$, $B_1$, . . . , $G_1$ run along the recording paper 22 in time series during one rotation of the drum 2. That is to say that as the drum 2 rotates, the elementary type electrodes $A_1$, $B_1$, . . . , $G_1$ serially will be presented in recording position opposite a respective associated stationary selector electrode. The printing areas on the recording sheet corresponding to the electrodes $A_1$, $B_1$, . . . , $G_1$ are respectively *a*1–*a*9, *b*1–*b*9, . . . , *g*1–*g*9 in FIGURE 1. In the course of the passage of the elementary printing areas *a*1–*a*9, if high voltage pulses are applied across the elementary type electrode, such as $A_1$ at the point in time when it is disposed opposite its respective stationary selector electrode, only that part of the recording sheet positioned under the elementary type electrode $A_1$ is charged to obtain an electrostatic charge pattern in the form of a dot. When the scanning of the type electrode $A_1$ has been completed, the scanning of the type electrode $B_1$ serially begins. At the beginning of the scanning of the $B_1$ electrode, the computer (through selecting circuit 18) switches the pulsed output of the character pulse generator 19–1 to the next adjacent high voltage pulse generator 20–2. Consequently, the $B_1$ electrode will then record the train $b_1$, $b_6$ and $b_9$. Similar operations are repeated in the order of $A_1$, $B_1$, . . . , $G_1$ to scan the printing areas *a*1–*a*9, *b*1–*b*9, . . . , *g*1–*g*9 in time series. Since the pattern drum 5 and the rotary printing type cylinder 2 are rotating in synchronism with each other, the pulse trains *a*1, *a*6, *a*7, *a*8, *a*9; *b*1, *b*6, *b*9; *c*1, *c*6, *c*9; *d*1, *d*6, *d*9; shown in FIGURE 6 (II) correspond to the printing areas associated with the type electrodes $A_1$, $B_1$, $C_1$, $D_1$, . . . respectively. That is, the pulse train *a*1, *a*6, *a*7, *a*8 and *a*9 is the pulse train which is generated when the space containing type electrode $A_1$ scans the printing area *a*1–*a*9 shown in FIGURE 1, and so on.

In more detail, while the type electrode $A_1$ scans over the area *a*1–*a*9 shown in FIGURE 1, the high voltage pulses *a*1, *a*2, *a*6, *a*7, *a*8 and *a*9 shown in FIGURE 6 (II) are applied across the type electrode $A_1$ and the fixed electrode 21–1 in time series in each moment that type electrode $A_1$ passes the area *a*1, *a*6, *a*8 and *a*9 shown in FIGURE 1. As a result, these areas only are charged. After the type electrode $A_1$ has passed the printing zone, the next type electrode $B_1$ begins to pass its associated elementary printing areas $b_1$–$b_9$ through the printing zone and similar operations are repeated. After one complete revolution of the drums 2 and 5, the operation of the type electrode $G_1$ is completed, and by conducting a development, the character "5" consisting of substantial dots as shown in FIGURE 2 appears on the recording sheet. In other words, by applying preset character pulse trains across the rotary drum and the fixed selector electrodes while the type electrodes $A_1$, $B_1$, . . . , $G_1$ are successively scanning the respectively vertically divided columns of characters *a*1–*a*9, *b*1–*b*9, . . . , *g*1–*g*9 as shown in FIGURE 1 in time series manner, various characters each consisting of dots as shown in FIGURE 3 can be electrostatically printed. By providing any number of rows of spaces of *n*-columns and 9 rows of elementary type electrodes on the peripheral surface of the rotary printing type cylinder 2 as shown in FIGURE 4, a desired character can be printed in any column.

Experiments conducted by the inventors according to the present invention will next be described. The rotary type-carrying electrode used took the form of an aluminum cylinder having a circumference of 320 millimeters and carrying on its peripheral surface eight sets of seven forms of elementary types, which have a height of approximately 0.3 millimeter and a diameter of approximately 0.4 millimeter and formed in relief by photocomposing means in respective positions relative to the character area of 3.2 mm. (vertical) by 2.5 mm. (transverse), as illustrated in FIG. 4. The rotary electrode was spaced from the fixed selector electrodes by a distance of 100 microns for use with an electrostatic recording sheet in the form of a bleached kraft paper approximately 50 microns thick, which was impregnated with a surface active agent selected from the cation group, air-dried and further coated with a polyethylene film approximately 10 microns thick. Impressed across the rotary and stationary electrodes was a series of high voltage pulses formed by triggering a high voltage pulse generating unit, including a combination of silicon controlled rectifier elements and step-up transformers, by a pulse signal including a series of character pulses. The high voltage pulses used had a rise of approximately 1 $\mu$sec., a wave peak of 1.0 to 1.4 kv. and a half-value width of approximately 15 $\mu$sec. Clearly defined electrostatically charged character images composed of combinations of elementary areas were obtained at speeds of the rotary electrode ranging from 5 to 150 revolutions per second (which corresponds to the printing speed of 15 to 450 lines per second).

In applying the present method to the electrostatic line-printing, the development and fixing of electrostatic charge images may be carried out according to any known techniques of the electronic photography.

It will be understood that the present invention may also be applied to a line-printing system employing electromagnetic hammers in place of the selector electrodes described.

As apparent from the foregoing, according to the present invention, only a very limited number of simple elementary types, for example, in five to fifteen kinds, are employed for printing over one hundred kinds of characters. Accordingly, the apparatus for carrying out the present method may be made extremely simple in structure, compact, and inexpensive and is capable of line-printing at speeds much higher than those obtained with conventional line-printing systems employing ordinary letter types. In addition, since the selection of characters to be printed in each column is performed simply by producing a signal including a series of character scanning pulses peculiar to the particular character at all times in synchronism with the movement of the types and connecting the signal to the input of the selective printing head, the line-printing operation can be performed in a very wide range of printing speed without undergoing any adverse effects of variation in speed. A further advantage of the present invention is that any characters may be printed simply by changing the character patterns on the pattern drum.

In the embodiment described, not only elementary types which correspond in number to the columns in the direction of which the character area is to be scanned but also a limited number of types having special forms inadequate to be divided into such elementary types are arranged on the rotary cylinder. It is to be understood, however, that in some applications such time-divisional printing may also be performed satisfactorily without use of special-form types.

What is claimed is:

1. A high speed printing apparatus for time-divisional printing comprising rotary printing means including a drum having a plurality of peripherally arranged columns of elementary type electrodes formed on the surface thereof with adjacent columns being arranged side by side so as to extend transverse to the direction of rotation of the rotary printing means, each of said elementary type electrodes corresponding to an elementary area of a matrix of elementary areas into which a character representing region is divided, a plurality of selectively energized, stationary selector electrodes positioned opposite the rotary printing means, the selector electrodes being arrayed in a line extending transverse to the direction of rotation of said rotary printing means and being equal in number to and positioned opposite respective columns of the elementary type electrodes to form an electrostatic charging space therebetween through which a recording medium is passed in synchronism with rotation of said rotary printing means, character signal pulse generating means operating in snychronism with the rotation of said rotary printing means for deriving pulse waveshape electric signals representative of the characters to be printed, the timing of said pulsed waveshape electric signals being synchronized with the rotation of the rotary printing means, at least two separate selector circuit means operatively coupled to the output from said character signal pulse generating means, high voltage pulse generating means operatively coupled to and controlled by the selector circuit means and having the output thereof coupled to the stationary selector electrodes for selectively applying pulsed waveshape electric signals to selected ones of said stationary selector electrodes, the selector circuit means also having an input operatively coupled to and controlled by the output from an electronic computer for controlling the selection of the stationary selector electrodes to be energized and the character representing-pulse waveshaped energizing signals applied thereto, and additional switching means for alternately switching each of the selector circuit means to the output of the computer for setting and for switching a set selector circuit means between the output of the character signal pulse generating means and the stationary selector electrodes for energizing the selector electrodes.

2. A high speed printing apparatus for time-divisional printing comprising rotary printing means including a drum having a plurality of peripherally arranged columns of elementary type electrodes formed on the surface thereof with adjacent columns being arranged side by side so as to extend transverse to the direction of rotation of the rotary printing means, each of said elementary type electrodes corresponding to an elementary area of a matrix of elementary areas into which a character representing region is divided, and a plurality of selectively energized, stationary selector electrodes positioned opposite the rotary printing means, the selector electrodes being arrayed in a line extending transverse to the direction of rotation of said rotary printing means and being equal in number to and positioned opposite respective columns of the elementary type electrodes to form an electrostatic charging space therebetween through which a recording medium is passed in synchronism with rotation of said rotary printing means, character signal pulse generating means operating in synchronism with the rotation of said rotary printing means for deriving pulse waveshape electric signals representative of the characters to be printed, the timing of said pulsed waveshape electric signals being synchronized with the rotation of the rotary printing means, and selector circuit means operatively coupled to the output from said character signal pulse generating means and to the stationary selector electrodes for selectively applying pulsed waveshape electric signals to selected ones of said stationary selector electrodes, said character signal pulse generating means comprising a second rotatable member rotated in synchronism with said rotary printing means, said second rotatable member having a plurality of character patterns formed thereon by a plurality of pattern forming marks, the spacing between the pattern forming marks being related to the spacing between adjacent peripherally arranged rows of elementary type electrodes on the rotary printing means, means coacting with the character patterns on the second rotatable member for developing a series of pulsed electric signals representative of a particular character, and pulse shaping circuit means operatively coupled to and controlled by the output from the last mentioned means for deriving the pulse waveshape electric signals representative of the characters to be printed.

3. A high speed printing apparatus according to claim 2 further including high voltage pulse generating means operatively coupled intermediate each stationary selector electrode and the output of the selector circuit means.

4. A high speed printing apparatus according to claim 3 wherein the selector circuit means is operatively coupled to and controlled by the output from an electronic computer for controlling the selection of the stationary selector electrodes to be energized and the character representing pulse wave shaped energizing signals applied thereto.

5. A high speed printing apparatus according to claim 4 wherein at least two separate selector circuit means are provided with additional switching means for alternately switching each of the selector circuit means to the output of the computer for setting and between the output of the character signal pulse generating means and the stationary selector electrodes for energizing the selector electrodes.

References Cited

UNITED STATES PATENTS

| | | | |
|---|---|---|---|
| 2,726,940 | 12/1955 | Buhler | 346—74 |
| 3,182,333 | 5/1955 | Amada et al. | 346—74 |
| 3,058,415 | 10/1962 | Hoffmann | 101 |
| 3,141,170 | 7/1964 | Wilkerson et al. | 101 |
| 3,184,749 | 5/1965 | Groth | 346—74 |
| 3,205,484 | 9/1965 | Schwartz | 346—74 |
| 3,234,904 | 2/1966 | Van Wagner | 346—74 |

OTHER REFERENCES

Mako, J. "Character Selection For Mosaid Printer" IBM TDB vol. 4, No. 5, October 1961.

TERRELL W. FEARS, *Primary Examiner.*

BERNARD KONICK, *Examiner.*

J. F. BREIMAYER, *Assistant Examiner.*